United States Patent
Lee et al.

[11] Patent Number: 6,031,697
[45] Date of Patent: Feb. 29, 2000

[54] METHOD OF CLEANING DISK DRIVE RECORDING HEAD

[75] Inventors: Sang Y. Lee, Pleasanton; Hyung J. Lee, Cupertino, both of Calif.

[73] Assignee: Samsung Electronics Co., Ltd., Suwon, Rep. of Korea

[21] Appl. No.: 09/012,970

[22] Filed: Jan. 26, 1998

Related U.S. Application Data

[62] Division of application No. 08/856,937, May 15, 1997.

[51] Int. Cl.$^7$ .................................................. G11B 5/41
[52] U.S. Cl. ............................................................. 360/128
[58] Field of Search ................................. 360/128, 137, 360/106, 78.04

[56] References Cited

U.S. PATENT DOCUMENTS

| | | |
|---|---|---|
| 4,586,100 | 4/1986 | Howe et al. ........................... 360/128 |
| 5,373,409 | 12/1994 | Wu ........................................... 360/128 |
| 5,424,884 | 6/1995 | Nonaka .................................. 360/74.1 |
| 5,635,269 | 6/1997 | Weir et al. . |

*Primary Examiner*—George J. Letscher
*Attorney, Agent, or Firm*—Jones Volentine, L.L.P.; Jeffrey P. Aiello

[57] ABSTRACT

A magnetic disk for self-cleaning a disk drive recording head communicating with a surface of the magnetic disk. The magnetic disk contains an abrasive cleaning zone of a designated width located at an outer periphery on the surface of the magnetic disk. When a recording head periodically passes over and contacts the abrasive surface of the cleaning zone, particles or other contaminants adhered to the recording head are mechanically removed by the relative motion between the rotating disk and the recording head. The recording head may then be returned to a landing zone on the disk, if the cleaning takes place at the end of a stop cycle, or the recording head may be returned to a track in a data zone on the disk if the cleaning takes place during normal disk drive operations.

4 Claims, 1 Drawing Sheet

METHOD OF CLEANING DISK DRIVE RECORDING HEAD

CROSS REFERENCE TO RELATED APPLICATIONS

This is a divisional application of application Ser. No. 08/856,937, filed May 15, 1997 pending.

BACKGROUND OF THE INVENTION

1. Field of the Invention

The present invention generally relates to a self-cleaning system for a disk drive recording head, and more particularly, to a cleaning zone having an abrasive surface that is located on the disk surface to mechanically clean the recording head as it passes over the cleaning zone.

2. Description of the Related Art

Computer disk drive technology evolution has focused on improvements in "areal density", that is, the number of bits of information that can be stored in a given space on a magnetic disk. Over the last decade, the majority of progress has been gained through miniaturization of the recording heads and improving the magnetic efficiency of the write/read elements in the heads, and similar improvements in the magnetic and physical properties of the disks.

Disk drives contain a plurality of recording heads that "fly" over rotating disks. The magnetic recording efficiency is a function of many physical characteristics of the heads and disks, the most significant of which is the spacing between the rotating disk surface 4 and the recording head 2 "pole" elements 6 as shown in FIG. 1. The most straightforward method for manufacturers to improve areal density has been to reduce the spacing between the head 2 and disk 4, without sacrificing the long term reliability of the disk drive.

Across the previous disk drive industry product offerings, head-disk spacing had steadily decreased from several micro-inches to less than two micro-inches, until there came a point that further increases in areal density required the head to essentially touch the disk during flying. A new class of so-called "pseudo-contact" heads were developed in which the rear portion of the head, where the transducer poles 6 are located, is in constant contact with the disk surface. Various design characteristics were developed to minimize friction and wear between the disk and head, and such "pseudo-contact" designs have proven to be as reliable over the long-term as the non-contact designs.

A problem arises, however, when foreign material or particles come between the head poles and the disk surface, causing a "spacing loss" that affects the magnetic recording process. The types and sources of the foreign material are numerous, including; particles generated by mechanical motion of components inside the drive, contamination introduced at the time of manufacture, and build-up of excessive lubricant from the disk surface onto the poles of the head. The build-up of contaminants can temporarily increase the spacing between the disk and the recording head, degrading the disk drive performance. Another disadvantage is that contaminants may fall from the recording head during the stop cycles, creating enough friction between the head, the disk and the contaminants that a disk drive motor can no longer move the recording head at the commencement of the start cycle.

Great care is taken to remove sources of contamination during assembly, and in the design and fabrication of components used inside the drive to reduce potential sources of particulate generation. But no volume manufacturing operation can produce completely contamination-free product, and the migration to pseudo-contact recording has significantly increased sensitivity to contamination.

In light of the foregoing, there exists a need for a system and method for periodically cleaning a recording head as passes over the surface of the magnetic disk, without materially degrading the performance of the disk drive.

SUMMARY OF THE INVENTION

The present invention is directed to an apparatus and method for self-cleaning a disk drive recording head which substantially overcomes one or more of the problems due to the limitations and disadvantages of the related art.

In general, the magnetic disk of the present invention employs a self-cleaning zone comprising an abrasive textured surface at the outer periphery of the disk. When the recording head periodically passes over and contacts the abrasive textured surface in the cleaning zone, particles or other contaminants adhered to the recording head are mechanically removed by the relative motion between the rotating disk and the recording head. The recording head may then be returned to a landing zone on the disk, if the cleaning takes place at the end of a stop cycle, or the recording head may be returned to a track and sector in a data zone on the disk if the cleaning takes place during normal disk drive operations.

To achieve these and other advantages and in accordance with the purpose of the invention, as embodied and broadly described, the invention provides for a magnetic disk for self-cleaning a disk drive recording head communicating with a surface of the magnetic disk, the magnetic disk comprising: a landing zone located at an inner periphery on the surface of the magnetic disk; an abrasive cleaning zone of designated width located at an outer periphery on the surface of the magnetic disk; and a data zone located on the surface of the magnetic disk, between the landing zone and the abrasive cleaning zone.

In another aspect, the present invention provides for a method of cleaning a disk drive recording head as it flies over a magnetic disk for reading data from, or writing data to, the magnetic disk, wherein the recording head is driven by a disk drive motor, the method comprising the steps of: providing a magnetic disk with a landing zone and a cleaning zone having an abrasive surface; moving the recording head to the cleaning zone when a stop motor command is received; maintaining the recording head in the cleaning zone during motor ramp-down; cleaning the recording head mechanically as the recording head contacts the abrasive surface of the cleaning zone; and moving the recording head to the landing zone before the motor stops.

In still another aspect, the method of cleaning may be utilized during normal operations of the recording head. In such a case, the recording head is moved back to a track in the data zone, rather than the landing zone, at the end of the cleaning step.

It is to be understood that both the foregoing general description and the following detailed description are exemplary and explanatory and are intended to provide further explanation of the invention as claimed.

BRIEF DESCRIPTION OF THE DRAWINGS

The foregoing and other objects, aspects and advantages will be better understood from the following detailed description of a preferred embodiment of the invention with reference to the drawings, the dimensions of which have been distorted and exaggerated to better illustrate the features of the present invention, where.

DETAILED DESCRIPTION OF A PREFERRED EMBODIMENT OF THE INVENTION

The present invention is directed to a magnetic disk employing a cleaning zone having an abrasive textured surface at the outer periphery of the disk. When the recording head periodically passes over and contacts the abrasive textured surface in the cleaning zone, foreign particles or other contaminants adhered to the recording head are mechanically removed by the relative motion between the rotating disk and the recording head.

Figure 2:
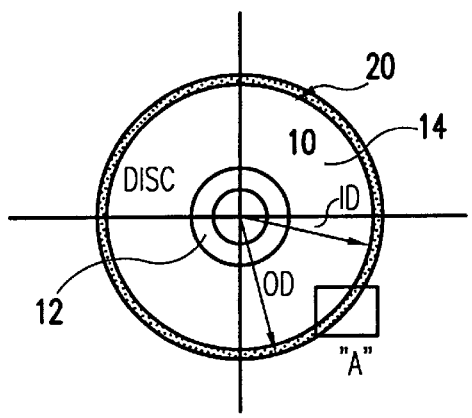
FIG. 2 is a plan view of magnetic disk having an abrasive cleaning zone according to the present invention.
Figure 3:
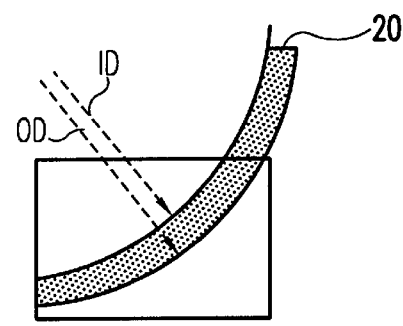
FIG. 3 is a magnified and more detailed view of the portion "A" of the abrasive cleaning zone of FIG. 2.

Reference will be made to FIGS. 2 and 3, which illustrate the magnetic disk having the abrasive cleaning zone according to the present invention. The magnetic disk 10 contains a landing zone 12, a data zone 14, and a cleaning zone 20. The landing zone 12, at the inner periphery of the disk, is the portion of the disk where the recording head returns to after each stop cycle. The data zone 14 typically contains a series of tracks and sectors for storing data and extends from the landing zone 12 toward the outer periphery of the disk.

Figure 1:
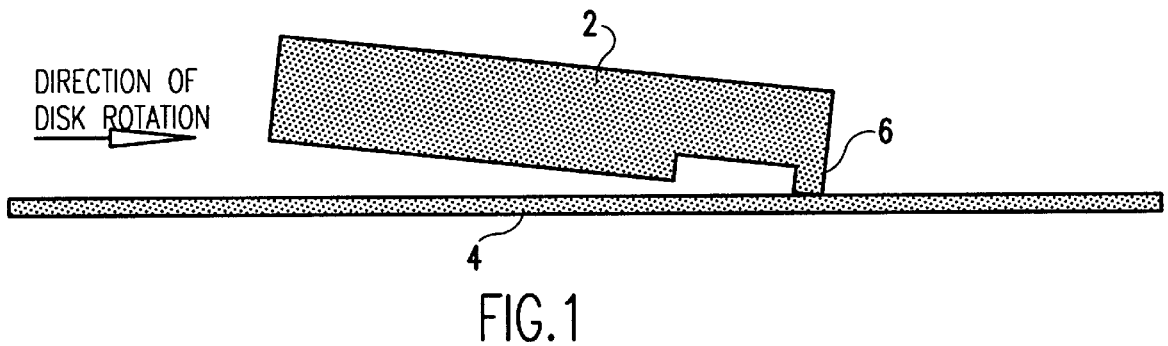
FIG. 1 is a side view of a recording head "flying" over a disk.

The magnetic disk 10 is driven by a motor (not shown) at a given rpm for reading data from, or writing data to, the disk. A recording head 2, similar to that shown in FIG. 1, moves or files above the disk. As the recording head 2 moves over the disk surface, however, foreign materials or particles can build-up between the head pole elements 6 of the recording head 2 and the disk surface.

Figure 4:
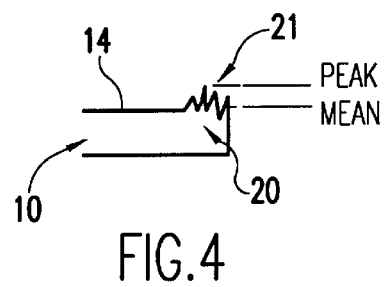
FIG. 4 is a side view showing the rough abrasive surface of the cleaning zone of FIG. 2.

Accordingly, the cleaning zone 20 is provided at the outer most periphery of the disk. The cleaning zone 20 has an abrasive textured surface 21 as shown in FIG. 4. During a cleaning step, particles are removed from the recording head 2 as it contacts the abrasive textured surface 21 due to the relative motion between the rotating disk 10 and the recording head 2. The mean-to-peak abrasiveness or roughness of the surface 21 of the cleaning zone 20 should be sufficient to ensure proper cleaning, but not cause the recording head 2 to crash. At an upper limit, therefore, the roughness of the surface 21 of the cleaning zone 20 should not exceed the flying height between the recording head 2 and the magnetic disk 10. Preferably, the roughness of the surface 21 of the cleaning zone 20 may exhibit mean-to-peak ranges from about 40% to about 80% of the flying height of the recording head 2. As stated previously, typical flying heights are generally less than two micro-inches.

The abrasive cleaning zone 20 may be prepared by either mechanical or thermal means. Such mechanical means may include, for example, an abrasive slurry deposited on the outer periphery of the magnetic disk. Also, an adhesive tape having an abrasive surface may be applied to the outer periphery of the magnetic disk. One example of a thermal means would be the use of a laser to melt certain portions of the outer periphery of the magnetic disk to create an abrasive textured surface.

The width of the cleaning zone 20, that is, the difference between the inner diameter (ID) and the outer diameter (OD) as shown in FIGS. 2 and 3, may vary depending on the width of the recording head. The disk drive industry generally categorizes the recording heads according to their width, with a so-called 100% recording head being approximately 0.126 inches or 126 mils in width. A 50% recording head would thus be approximately 0.063 inches or 63 mils. Table 1 below lists four typical recording heads and their widths.

TABLE 1: Recording Head Types/Widths.

TABLE 1

| Recording Head Types/Widths | | | | |
|---|---|---|---|---|
| Recording Head Type | 100% | 70% | 50% | 30% |
| Width (mils) | 126 | 89 | 63 | 38 |

The width of the cleaning zone 20 may be less than the recording head width, equal to the recording head width, or greater than the recording head width. Preferably, the width of the cleaning zone 20 would range from about 0% to about 30% wider than width of the particular recording head that is employed. For example, with a 30% recording head, the width of the cleaning zone would range from about 38 mils to about be about 50 mils.

What is important is that the width of the cleaning zone 20 be wide enough to achieve a thorough cleaning of the recording head without sacrificing too much time or causing too much of a reduction in the "areal density" of the data zone 14, that is, the number of bits of information that can be stored in a given space on a magnetic disk. Thus, one seeks to achieve a minimum functional width of the cleaning zone 20 while maximizing the data zone 14 to ensure optimum data storage performance.

The magnetic disk 10 having an abrasive cleaning zone 20 according to the present invention may be utilized during various operating modes of the disk drive system. For example, during a stop cycle, the recording head is moved to the cleaning zone 20 when a stop motor command is received. The recording head is mechanically cleaned in the cleaning zone 20 during motor ramp-down as the recording head contacts the abrasive textured surface 21. The recording head is then moved to the landing zone 12 before the motor stops.

The abrasive magnetic disk 10 of the present invention may also be utilized during the normal operating mode of the disk drive system. In such a case, the recording head is periodically moved from its present track and sector position in the data zone 14 to the cleaning zone 20 while the motor is operating. The periodicity will vary, and is generally on the order of every 5 to 10 hours, or whenever a malfunction occurs during normal operations. After moving to the cleaning zone 20, the recording head remains in the cleaning zone 20 for a designated time period or designated number of revolutions to ensure sufficient cleaning. Preferably, the recording head would be resident in the cleaning zone 20 for about 10 revolutions of the magnetic disk, although applications involving more or less recording head residence time are contemplated within the scope of the present invention. What is important is that the recording head be sufficiently cleaned without undue delay in the functional operation of the disk drive. In the above example, with a disk rotating at 5400 rpm, the recording head would be resident in the cleaning zone for about 0.11 seconds or 110 ms (i.e., 5400 rpm=90 rps=0.011 sec/rev, multiplied by 10 revolutions, equals 0.11 seconds). The recording head is then moved back to the prior track and sector in the data zone 14 at the end of the designated period.

The abrasive cleaning disk and method of the present invention may be utilized in many types of disk drive systems, including hard disk drives or removable hard disk cartridge systems.

While the invention has been described in terms of the embodiments described above, those skilled in the art will recognize that the invention can be practiced with modification within the spirit and scope of the appended claims and their equivalents.

Having thus described my invention, what we claim as new and desire to secure by letters patent is as follows:

1. A method of cleaning a disk drive recording head as it flies over a rotating magnetic disk for reading data from, or writing data to, the magnetic disk, wherein said recording head is driven by a disk drive motor, said method comprising the steps of:

provinding the magnetic disk with a landing zone and a cleaning zone having an abrasive surface;

moving said recording head to the cleaning zone when a stop motor command is received;

maintaining said recording head in the cleaning zone during motor ramp-down;

cleaning said recording head mechanically as said recording head contacts said abrasive surface of the cleaning zone; and moving said recording head to the landing zone before the motor stops.

2. The method of cleaning as in claim 1, wherein during said cleaning step, particles are removed from the recording head as it contacts the abrasive surface due to the relative motion between the rotating disk and the recording head.

3. The method of cleaning as in claim 1, further comprising a step of forming said abrasive surface by a mechanical means.

4. The method of cleaning as in claim 1, further comprising a step of forming said abrasive surface by a thermal means.

* * * * *